(12) United States Patent
Stefan et al.

(10) Patent No.: US 6,507,785 B1
(45) Date of Patent: Jan. 14, 2003

(54) METHOD AND SYSTEM FOR DETECTING AND CORRECTING OFF ROUTE NAVIGATION FOR SERVER BASED ROUTE GUIDANCE SYSTEMS

(75) Inventors: Jeffrey M. Stefan, Clawson, MI (US); Jasmin Jijina, West Bloomfield, MI (US)

(73) Assignee: General Motors Corportion, Detroit, MI (US)

( * ) Notice: Subject to any disclaimer, the term of this patent is extended or adjusted under 35 U.S.C. 154(b) by 0 days.

(21) Appl. No.: 09/960,693

(22) Filed: Sep. 21, 2001

(51) Int. Cl.[7] .................. G06F 165/00; G06F 17/00; G06F 19/00; G01C 21/00; G01C 22/00

(52) U.S. Cl. .................. 701/210; 701/200; 701/217; 701/24; 701/23; 340/995; 340/989; 340/988; 340/990; 340/945; 342/357.08; 342/357.13; 342/357.09; 455/412; 455/413; 455/414

(58) Field of Search .................. 701/200, 210, 701/217, 23, 24; 340/995, 989, 988, 990, 945; 342/357.08, 357.13, 357.09; 455/412, 413, 414

(56) References Cited

U.S. PATENT DOCUMENTS

| | | | | |
|---|---|---|---|---|
| 5,638,280 A | * | 6/1997 | Nishimura et al. | 340/990 |
| 5,902,349 A | * | 5/1999 | Endo et al. | 340/990 |
| 5,926,118 A | * | 7/1999 | Hayashida et al. | 340/995 |
| 5,931,888 A | * | 8/1999 | Hiyokawa | 701/208 |
| 5,977,885 A | * | 11/1999 | Watanabe | 340/988 |
| 6,061,630 A | * | 5/2000 | Walgers et al. | 340/988 |
| 6,101,443 A | * | 8/2000 | Kato et al. | 340/995 |
| 6,249,740 B1 | * | 6/2001 | Ito et al. | 340/910 |

* cited by examiner

*Primary Examiner*—William A. Cuchlinski, Jr.
*Assistant Examiner*—Ronnie Mancho
(74) *Attorney, Agent, or Firm*—Anthony Luke Simon

(57) ABSTRACT

The present invention provides a system, a method and a computer usable medium including a program for a vehicle that has traveled off of a planned route.

This may be done by providing a plurality of nodes located on road segments, generating a plurality of pre-established checkpoints at intersections and receiving a signal including a location coordinate identifying current vehicle position. It may also be done by comparing the vehicle coordinates to the coordinates of checkpoints, constructing a proximity ellipse in response to the aforementioned comparison and identifying at least one return path cycle within the ellipse with acceptable road segments that allow travel back to a planned route.

20 Claims, 4 Drawing Sheets

100

400

METHOD AND SYSTEM FOR DETECTING AND CORRECTING OFF ROUTE NAVIGATION FOR SERVER BASED ROUTE GUIDANCE SYSTEMS

FIELD OF THE INVENTION

This invention relates generally to the navigation of a moving vehicle. In particular, this invention relates to a method and system for detecting and correcting off route navigation.

BACKGROUND OF THE INVENTION

As wireless communication continues to evolve, state of the art systems and technology continues to also increase in usefulness and effectiveness. Expectation of technology is also increasing and there is a growing need to develop applications, equipment and methods to drive this effectiveness even higher, while lowering cost. Costs are lowered primarily through building more capacity and functionality in existing technology or through designing systems or methods that require less processing time and increases data accuracy and transmission volume.

Many of these new developments in functionality are a result of advances in software development via complex algorithms based on established methods known in the art. In this inventions several key concepts are used to address a typical navigation challenge, which is a vehicle detouring off of a planned route.

It would be desirable therefore to provide a method for detecting and correcting off-route navigation to provide more effective navigation instructions to a moving vehicle that overcomes the above.

SUMMARY OF THE INVENTION

One aspect of the present invention provides a method of generating more effective navigation instructions for a vehicle that has traveled off of a planned route. A plurality of nodes located on road segments is provided, a plurality of pre-established checkpoints at intersections is generated and a signal including location coordinates identifying a vehicles current position is received. A vehicle's coordinates are compared to checkpoints coordinates, a proximity ellipse is constructed in response to the comparison of a vehicle's location coordinates to the coordinates of the checkpoints and determination is made if at least one return path cycle exist within a proximity ellipse.

Another aspect of the system provides a computer usable medium including a program for generating more effective navigation instructions for a vehicle that has traveled off of a planned route. The program may include computer readable program code that provides a plurality of nodes located on road segments, generates a plurality of pre-established checkpoints at intersections and receives a signal including location coordinates identifying a vehicle's current position. The program may also include computer readable program code that compares a vehicle's coordinates to coordinates of checkpoints, constructs a proximity ellipse in response to the comparison of the vehicle's location coordinates to the coordinates of the checkpoints and identifies at least one return path cycle within the proximity ellipse.

Another aspect of the present invention provides a system for generating more effective navigation instructions for a vehicle that has traveled off of a planned route. The system may include means for providing a plurality of nodes located on road segments, means for generating a plurality of pre-established checkpoints at intersections and means for receiving a signal including location coordinates identifying a vehicle's current position. It may also include means for comparing the vehicle's coordinates to coordinates of checkpoints, means for constructing a proximity ellipse in response to the comparison of the vehicle's location coordinates to the coordinates of the checkpoints and means for identifying at least one return path cycle within the proximity ellipse.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
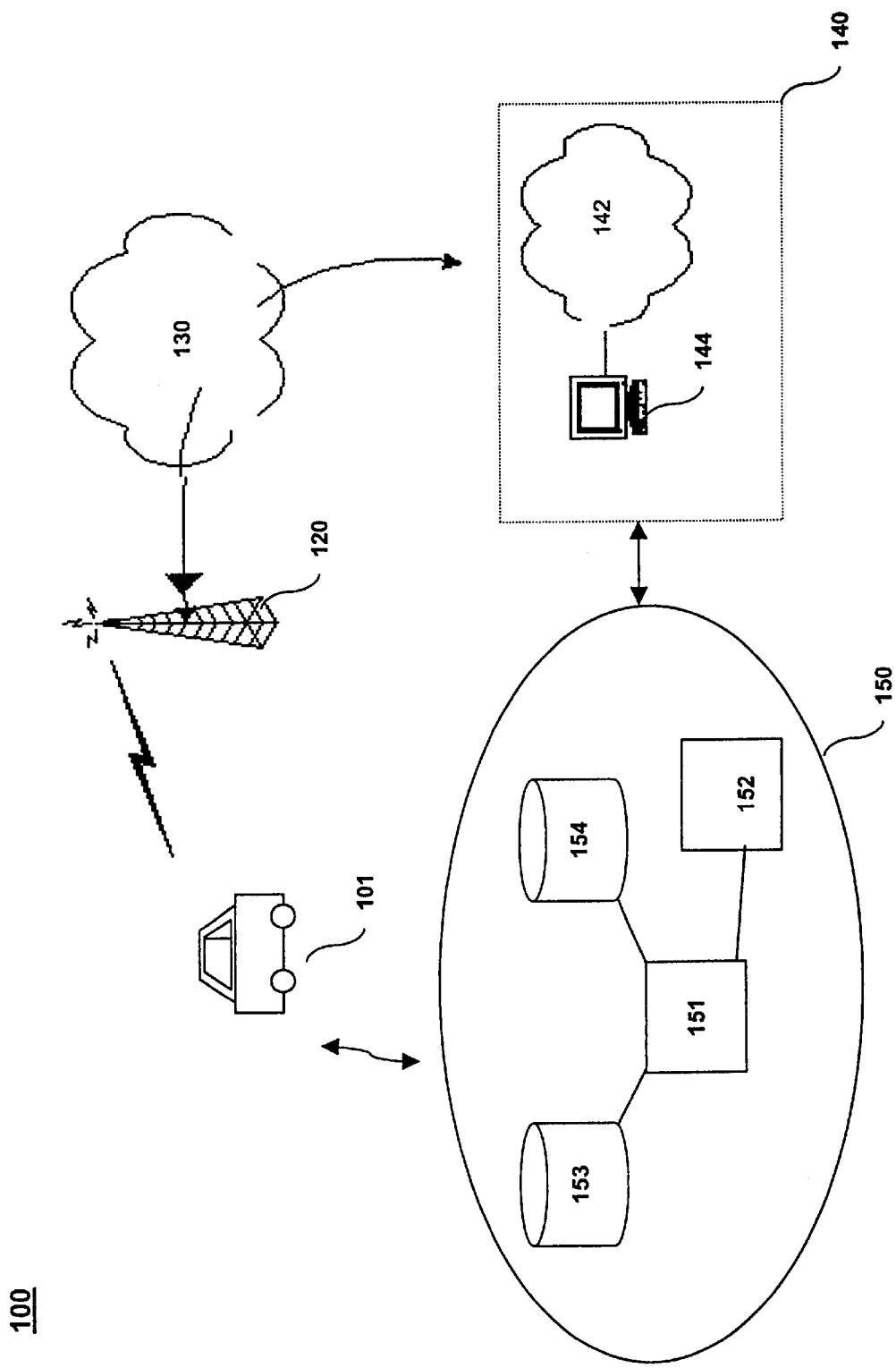
FIG. 1 is a schematic diagram of a system for generating navigation information for a vehicle in accordance with the present invention.

FIG. 1 shows one embodiment of a system for providing services to a vehicle in accordance with the present invention at 100.

The system may include one or more vehicle clients 101, one or more carrier systems 120, one or more communication networks 130, one or more service management subsystems 140, and one or more navigation subsystems 150. The service management subsystems may comprise one or more service management applications 142 and one or more service managers 144. The navigation subsystems 150 may comprise one or more route applications 151, 152 and one or more coordinate databases 153, 154.

Navigation subsystem 150 is a system for generating routes to be delivered to vehicle client 101 and for receiving route information from vehicle client 101. Navigation subsystem 150 may be connected with or in communication with service management subsystem 140. Service management subsystem 140 may be used to manage the delivery of information to or from navigation subsystem 150 to other parts of system 100. Routes may be delivered or information may be received via a live agent, such as a human advisor, or via a virtual agent, such as an interactive computer program.

Navigation subsystem 150 may be any suitable hardware or software configuration, or combination of hardware and software that is configured to generate a route, process route information or receive information from vehicle client 101. In one embodiment of the invention, navigation subsystem 150 comprises one or more route applications 151, 152 and one or more coordinate databases 153, 154. For example, route applications 151, 152 may be any suitable software application for generating route information or otherwise processing route information. Coordinate databases 153, 154 may be any suitable databases for storing route information, such as location coordinates.

Vehicle client 101 may be any suitable vehicle. For example, the vehicle may be an automobile or a passenger-carrying unit such as a bus or train. Alternatively, vehicle client 101 may be an occupant of the vehicle or any suitable client device contained in the vehicle. In one embodiment of the invention, vehicle client 101 may be a mobile or portable device equipped to communicate with service management subsystem 140. Carrier system 120 may be any suitable system for transmitting a signal from vehicle 101 to service management subsystem 140. Carrier system 120 may also transmit a signal from service management subsystem 140 to vehicle client 101. In one embodiment of the invention, carrier system 120 may be a wireless carrier system as is well known in the art. Carrier system 120 may be; for example, a transmitter/receiver unit attached to vehicle client 101. Alternatively, carrier system 120 may be a separate transmitter/receiver carried by vehicle client 101.

Communication network 130 may be any suitable system for communicating between vehicle client 101 and service management subsystem 140. In one embodiment of the invention, communication network may be a public switched telephone network (PSTN). Alternatively, communication network 130 may be a multiprotocol Internet or Intranet capable or transmitting voice and/or data in either analog or digital form or a combination of both. Alternatively, communication network 130 may be a hybrid communication network or virtual network.

Service management subsystem 140 may be a system for managing a variety of services to be delivered to or from vehicle client 101. In one embodiment of the invention, service management subsystem 140 manages services that can be distributed over a variety of channels. For example, services may be delivered via a live agent, such as a human advisor, or via a virtual agent, such as an interactive computer program. The structure of service management subsystem 140 may enable services to be delivered in a uniform manner regardless of the channel used for delivery or of the service being delivered. Service management subsystem 140 may maintain a consistent subscriber experience and "look and feel" across the products being delivered across the service distribution channels enabled.

Figure 2:
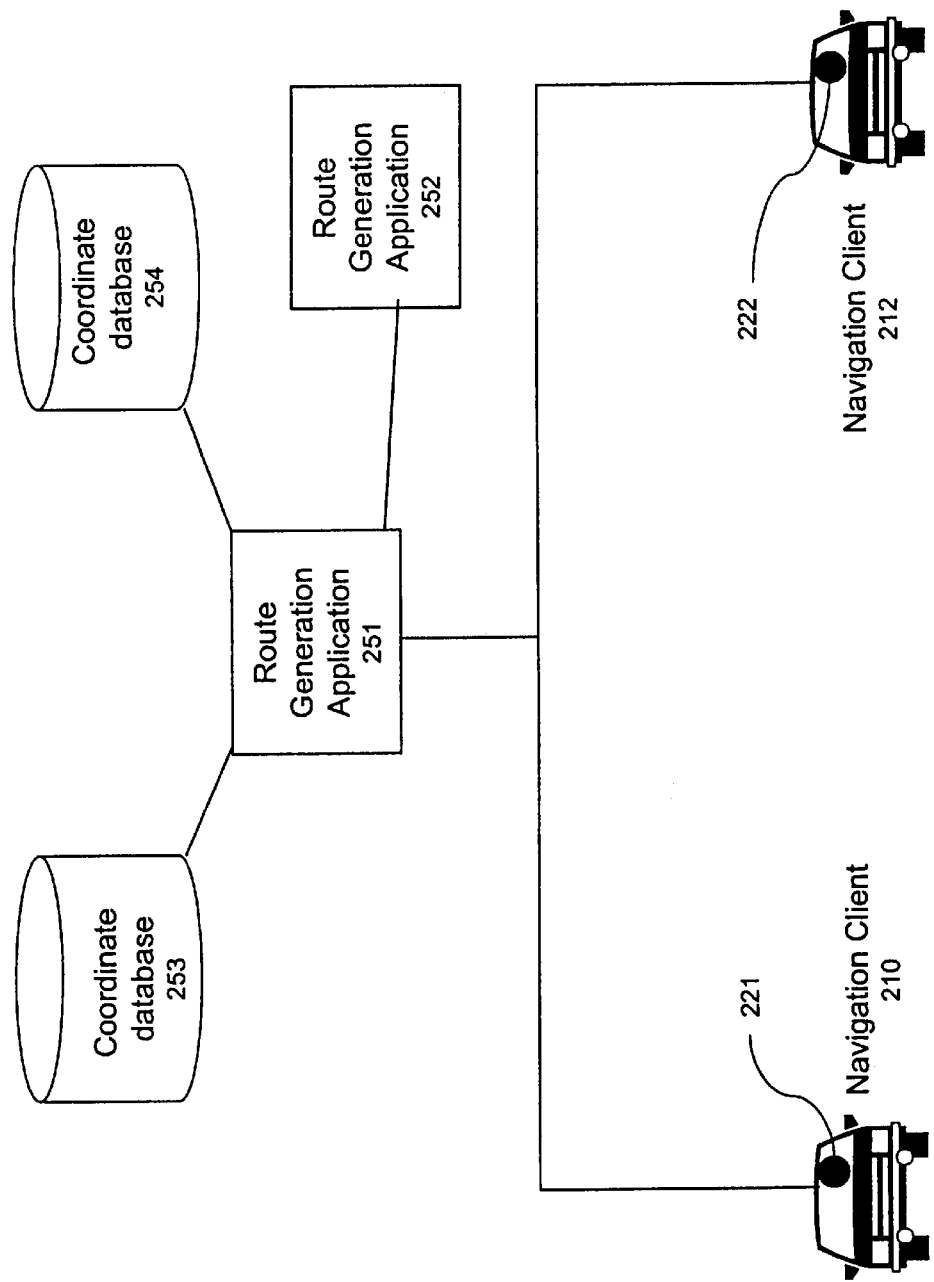
FIG. 2 is a schematic diagram of another embodiment of a system for generating navigation information for a vehicle in accordance with the present invention.

FIG. 2 shows one embodiment of a navigation system in accordance with the present invention at 200. Navigation system 200 may include one or more navigation clients 210, 212. Each navigation client 210, 212 may have an in-vehicle navigator 221, 222. Navigation system 200 may also include one or more route generation applications 251, 252. Navigation system 200 may also include one or more coordinate databases 253, 254.

Navigation clients 210, 212 may be one or more vehicle clients as described above.

In-vehicle navigator 221, 222 may be any suitable component of navigation client 210, 212, which may be used to navigate vehicle client 210, 212. For example, in-vehicle navigator 221, 222 may be a driver. Alternatively, in-vehicle navigator 221, 222 may be an automatic system for navigating vehicle 210, 212.

Route generation applications 251, 252 may be any suitable application for calculating maneuver lists of directions between one or more locations. For example, route generation applications 251, 252 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 251, 252 are in communication with coordinate databases 253, 254.

Route generation applications 251, 252 may generate navigation information in any suitable manner. For example, route generation applications 251, 252 may generate routes using geocoding. That is, the application 251, 252 determines a corresponding latitude and longitude based on an input navigation address. Alternatively, route generation applications 251, 252 may generate routes using reverse geocoding. That is, the application 251, 252 determines a corresponding navigation address based on input latitude and longitude coordinates.

Coordinate databases 253, 254 may be any suitable databases for storing such location coordinates as latitude and longitude of a variety of locations. These locations may be, for example, points of interest. Coordinate databases 253, 254 may also be a database of street addresses. Coordinate databases 253, 254 may also be a database of routes between points.

Figure 3:
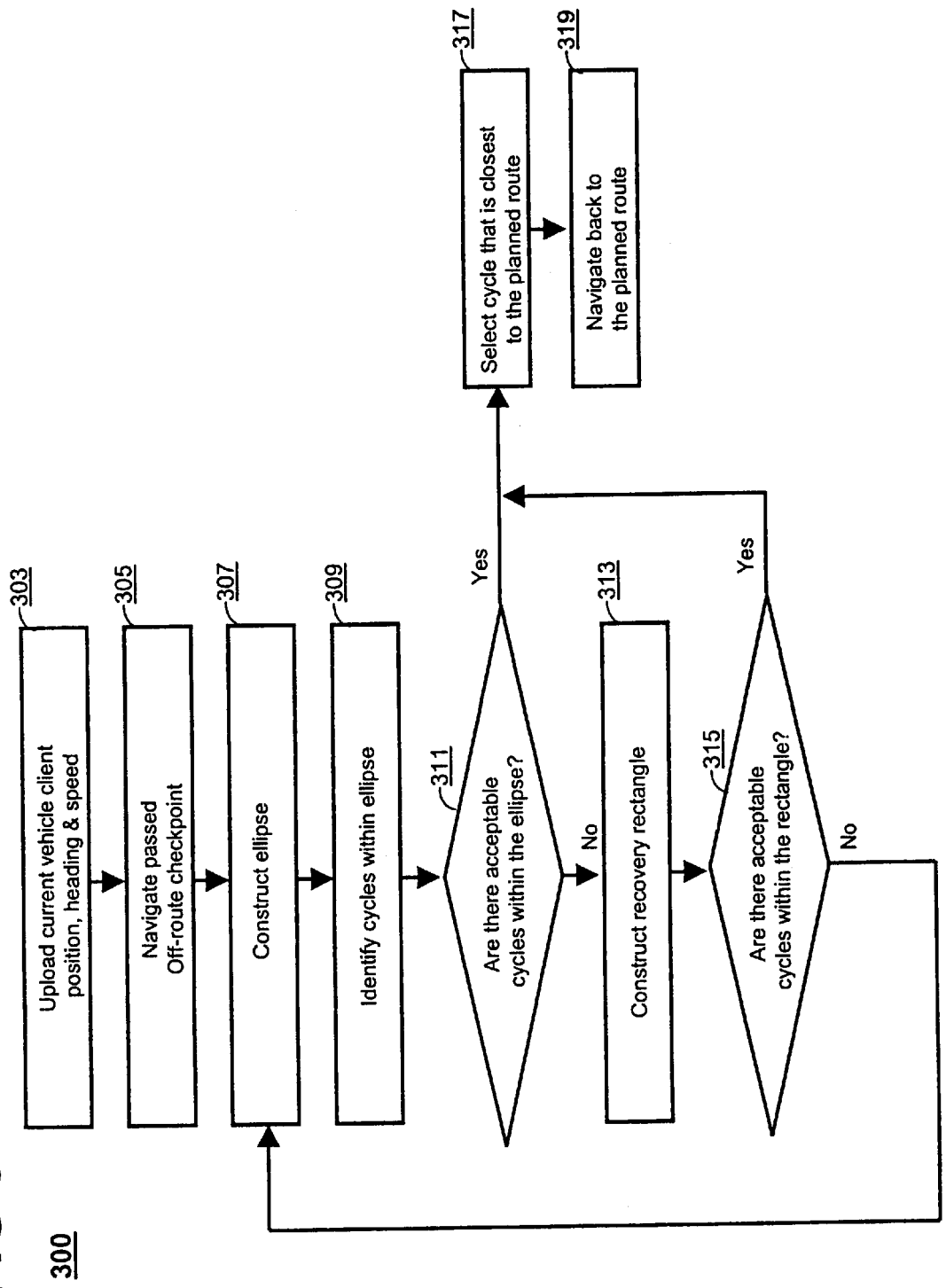
FIG. 3 is a flow diagram of one embodiment of a method for of a method for detecting and correcting off-route navigation of a vehicle in accordance with the present invention.
Figure 4:
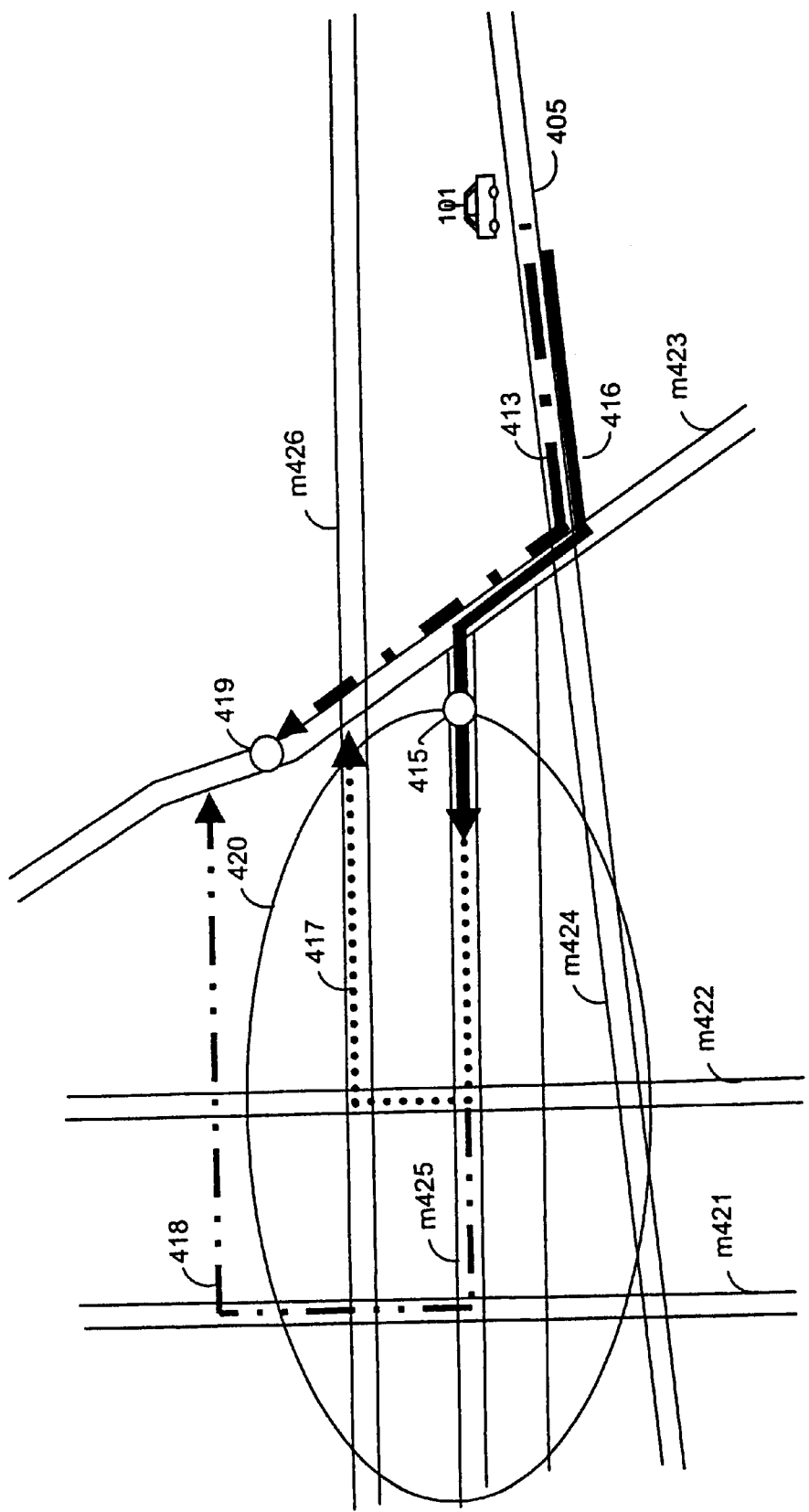
FIG. 4 is a sequence diagram of one embodiment of a method for detecting and correcting off-route navigation of a vehicle in accordance with the present invention.

Referring now to FIG. 3 and FIG. 4. FIG. 3 shows a flow diagram of one embodiment of a method for detecting and correcting off-route navigation of a vehicle in accordance with the present invention at 300. FIG. 4 is a sequence diagram of one embodiment of a method for detecting and correcting off-route navigation of a vehicle in accordance with the present invention at 400.

The client vehicle may upload coordinates identifying its current position and, heading and speed information to the navigation system server 150 (block 303). The vehicle continues to navigate along a planned route 413 which may have been downloaded from the navigation system server 150. The vehicle may detour off of the planned route 413 and approach and pass an off-route checkpoint (block 305). Crossing the off-route checkpoint may signal a failure to execute an expected maneuver and may for example, trigger an audible or visible alarm. In this embodiment, the crossing of an off-route checkpoint may trigger the construction of a proximity ellipse (block 307) by a method known in the art. The area within the proximity ellipse contains nodes and road segments. Using methods know in graph theory, these nodes and road segments can be connected to generate a return path, known in the art as a cycle, that may be navigated to return to a node on the planned route 413. Candidate cycles within the ellipse may be identified (block 309) and if acceptable candidate cycles found within this list (block 311), the cycle that is closest to the planned route may be selected (block 317) and the vehicle may navigate back to a node on the planned route 413. If no acceptable cycles are found in the ellipse, a recovery rectangle 418 can be constructed (block 313) by using the leftmost focal point of the proximity ellipse as the rightmost point of the rectangle. The major axis length of the recovery rectangle may be predetermined based on various conditions, for example, road density, vehicle speed and navigation server information load. Candidate return path cycles may be identified within this rectangle. The return path cycle that is closest to the navigating vehicle 101 may be selected (block 317) and the vehicle may use this cycle to navigate to a node back on the planned route 413 (block 319). If acceptable cycles are not found in the recovery rectangle (block 315), another ellipse may be constructed using the leftmost rectangle point as the rightmost ellipse focal point. The process of identifying candidate cycles and selecting the cycle closest to the travelling vehicle may continue until an acceptable cycle is identified or until another predetermined action is triggered. In some embodiments the number of times that this process is repeated may be predetermined on the navigation system server 150.

Referring now to FIG. 4, before the vehicle begins to navigate, communication may be established with navigation system server 150. A planned route 413 may be generated using the route generation applications 251, 252 and then downloaded from the navigation system server 150 along with a list of off-route checkpoints. Point 405 may be the starting point of the vehicle client 101 on the planned route 413 and may be the planned end point 419. As shown in the actual route 416 the client vehicle may incorrectly turn left at street m425. It may than cross checkpoint 415 signaling that it has detoured off of the planned route 413 and an audible or visual signal may be triggered. An ellipse 420 may be constructed by a method known in the art, using the off-route checkpoint location as the rightmost focal point for the ellipse. The major axis can be determined based on various factors. In this embodiment, it is based on the current road density of the navigated road segment of street m425, the navigating vehicle speed and the information load of the navigation system server 150. The area bound by the ellipse contains road segments and nodes which can be connected to form a navigable path. Based on a method known in the art of graph theory, a cycle may be connected road segments and nodes that form a route with its end point being connected to a node on planned route 413. Candidate cycles may be identified within the proximity ellipse by a method known in the art and cycle 417 may be the cycle nearest to the current location of the vehicle and may be identified as the innermost acceptable cycle. The vehicle may select the first cycle 417 as the route to navigate back to the planned route 413.

Had there been no acceptable cycles found within the ellipse, a recovery rectangle 418 may have been constructed. The focal points of the ellipse may be used as the baseline for the construction of the rectangle.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of dynamically generating navigation instructions for a vehicle that has traveled off a planned route, comprising:
   providing a plurality of nodes, the nodes located on road segments;
   generating, at a remote route generation application, a plurality of checkpoints at intersections, the checkpoints having checkpoint coordinates;
   receiving, at the remote route generation application, vehicle location coordinates, the vehicle location coordinates identifying a current vehicle position;
   comparing, at the remote route generation application, the vehicle location coordinates to the checkpoint coordinates;
   constructing, at the remote route generation application, a proximity ellipse based on the comparison of the vehicle location coordinates to the checkpoint coordinates; and
   determining whether at least one return path cycle is within the proximity ellipse, the return path cycle comprising at least one node on the planned route.

2. The method of claim 1, wherein the checkpoints are pre-established by the remote route generation application, further comprising:
   downloading the checkpoints from the remote route generation application to the vehicle.

3. The method of claim 1, further comprising:
   predetermining the planned route at the remote generation application; and
   downloading the planned route to the vehicle.

4. The method of claim 1, wherein a rightmost focal point of the proximity ellipse comprises the current vehicle location.

5. The method of claim 1, wherein the return path cycle comprises at least one navigable road segment that connects to a node on the planned route.

6. The method of claim 1, further comprising:
   selecting the return path cycle which is closest to the planned route.

7. The method of claim 1, further comprising:
   constructing a recovery rectangle if no return path cycle exists within the proximity ellipse.

8. The method of claim 7, wherein a leftmost focal point of the proximity ellipse comprises a rightmost point of the recovery rectangle.

9. Computer program product in a computer usable medium for dynamically generating navigation instructions for a vehicle that has traveled off a planned route, comprising:
   computer program code that providing a plurality of nodes, the nodes located on road segments;
   computer program code generating, at a remote route generation application, a plurality of checkpoints at intersections, the checkpoints having checkpoint coordinates;
   computer program code that receives, at the remote route generation application, vehicle location coordinates, the vehicle location coordinates identifying a current vehicle position;
   computer program code that compares, at the remote route generation application, the vehicle location coordinates to the checkpoint coordinates;
   computer program code that constructs, at the remote route generation application, a proximity ellipse based on the comparison of the vehicle location coordinates to the checkpoint coordinates; and
   computer program code that determines whether at least one return path cycle is within the proximity ellipse.

10. The program of claim 9, wherein the checkpoints are pre-established by the remote route generation application, further comprising:
    computer program code that downloads the checkpoints from the remote route generation application to the vehicle.

11. The program of claim 9, further comprising:
    computer program code that predetermines the planned route at the remote generation application; and
    computer program code that downloads the planned route to the vehicle.

12. The program of claim 9, wherein a rightmost focal point of the proximity ellipse comprises the current vehicle location.

13. The program of claim 9, wherein the return path cycle comprises at least one navigable road segment that connects to a node on the planned route.

14. The program of claim 9, further comprising:

computer program code that selects the return path cycle which is closest to the planned route.

15. The program of claim 9, further comprising:

computer program code that constructs a recovery rectangle if no return path cycle exists within the proximity ellipse.

16. The program of claim 15, wherein a leftmost focal point of the proximity ellipse comprises a rightmost point of the recovery rectangle.

17. A system for remotely generating navigation instructions for a vehicle that has traveled off of a planned route comprising:

means for providing a plurality of nodes, the nodes located on road segments;

means for generating, at a remote route generation application, a plurality of checkpoints at intersections, the checkpoints having checkpoint coordinates;

means for receiving, at the remote route generation application, vehicle location coordinates, the vehicle location coordinates identifying a current vehicle position;

means for comparing, at the remote route generation application, the vehicle location coordinates to the checkpoint coordinates;

means for constructing, at the remote route generation application, a proximity ellipse based on the comparison of the vehicle location coordinates to the checkpoint coordinates; and means for determining whether at least one return path cycle is within the proximity ellipse.

18. The system of claim 17, further comprising:

means for selecting the return path cycle which is closest to the planned route.

19. The system of claim 17, further comprising:

means for constructing a recovery rectangle if no return path cycle exists within the proximity ellipse.

20. The system of claim 17, further comprising:

means for predetermining the planned route at the remote generation application; and means for downloading the planned route to the vehicle.

* * * * *